May 9, 1950 R. E. FARMER 2,507,000
TRACTOR STEERING GEAR
Filed Aug. 1, 1946 4 Sheets-Sheet 2

ROY E. FARMER
INVENTOR.

BY
ATTORNEYS.

May 9, 1950 R. E. FARMER 2,507,000
TRACTOR STEERING GEAR
Filed Aug. 1, 1946 4 Sheets-Sheet 3

ROY E. FARMER
INVENTOR.

BY
ATTORNEYS.

ROY E. FARMER
INVENTOR.
BY
ATTORNEYS.

Patented May 9, 1950

2,507,000

UNITED STATES PATENT OFFICE 2,507,000

TRACTOR STEERING GEAR

Roy E. Farmer, Detroit, Mich., assignor to Ford Motor Company, Dearborn, Mich., a corporation of Delaware Application August 1, 1946, Serial No. 687,679

1 Claim. (Cl. 280—87)

This application is concerned with vehicular steering gear, and, more particularly, with a steering gear specifically adapted to agricultural tractors in which directional control is accomplished by a steering wheel which is mounted in a vertical plane through the transverse midsection of the vehicle, and in which the tread of the front wheels is adjustable. Heretofore tractors have been controlled through this type of centrally located steering gear with the output of such steering gear taken off on either or both sides of the steering gear box. Where the output has been taken off on only one side, the remainder of the steering mechanism has closely followed automotive practice and made use of the conventional tie rod for connecting the front wheels. Where the output has been taken off from both sides of the gear box through two individual steering arms, a separate drag link has been provided for each front wheel. It is this latter type of double take-off steering gear with which this application is concerned.

In agricultural tractors it is often desirable to vary the tread of the front wheels. Such variation is necessary to permit the planting, working and harvesting of various row crops. Were the tread of the wheels fixed, no opportunity would be afforded the agrarian to space the rows according to the needs of the particular crop since such spacing would be dictated by the necessity of clearing the wheels of the tractor. A tractor now widely used provides eight adjustments of tread of the front wheels. The spacing of these front wheels can be varied from 48 to 76 inches in 4-inch steps. These adjustments are obtained by providing a co-operating front axle and front wheel supports.

The forward face of the front axle and the rear face of the wheel-supporting elements are machined so that a solid bearing surface is obtained. The wheel supports are attached to the front axle by a series of bolts. To vary the tread, it is only necessary to remove these bolts, slide the wheel-supporting elements along the axle to the new position and refasten the bolts. By such adjustment, the normal tread of the wheels can be set at 48, 52, 56, 60, 64, 68 or 72 inches. Another four inches can be added to the extreme adjustment of 72 inches by removing the front wheels and replacing them with the faces which are normally on the outside turned in.

This method of adjusting tread of course introduced complications into the geometry of the steering mechanism. Heretofore these complications have been minimized by mounting the rear attachment of the radius rods and the drag link ends of the steering arms in a vertical line in the neutral or straight ahead position. Thus, with the rear end of the radius rods directly below the drag link ends of the steering arms, the drag links and radius rods would swing about centers located on the same vertical line when the tread was changed and there would be no adverse change in the steering geometry.

This method has the disadvantage however that it requires that the two take-off shafts of the steering gear be coaxial and also that these shafts revolve in opposite directions. These requirements have in the past led to some rather bulky and expensive constructions. Applicant has invented a steering mechanism for such tractors in which the rear ends of the radius rods and the drag link ends of the steering arms need not be located in the same vertical or horizontal line in the neutral or straight ahead position. Despite this new degree of freedom, proper steering geometry is maintained in all eight positions to which the front wheels are adjusted in varying the tread. With the rigid requirements anent this location of the rear end of the radius rods and the drag link ends of the steering arms removed, it has been possible to design much more compact, efficient and less costly steering gears in which the two offtake shafts are not coaxial, but are displaced either vertically, or horizontally, or both.

Accordingly, it is an object of this invention to provide a steering mechanism for an adjustable tread tractor in which the adjustment of the tread does not adversely affect the steering geometry of the vehicle.

It is a further object of this invention to provide a steering mechanism for such tractors in which the take-off shafts on the steering gear box are not coaxial.

With these and other objects in view, the invention consists in the arrangement, construction and combination of the various parts of the improved structure as described in the specification, claimed in the claim and illustrated in the accompanying drawings, in which:

Figure 1:
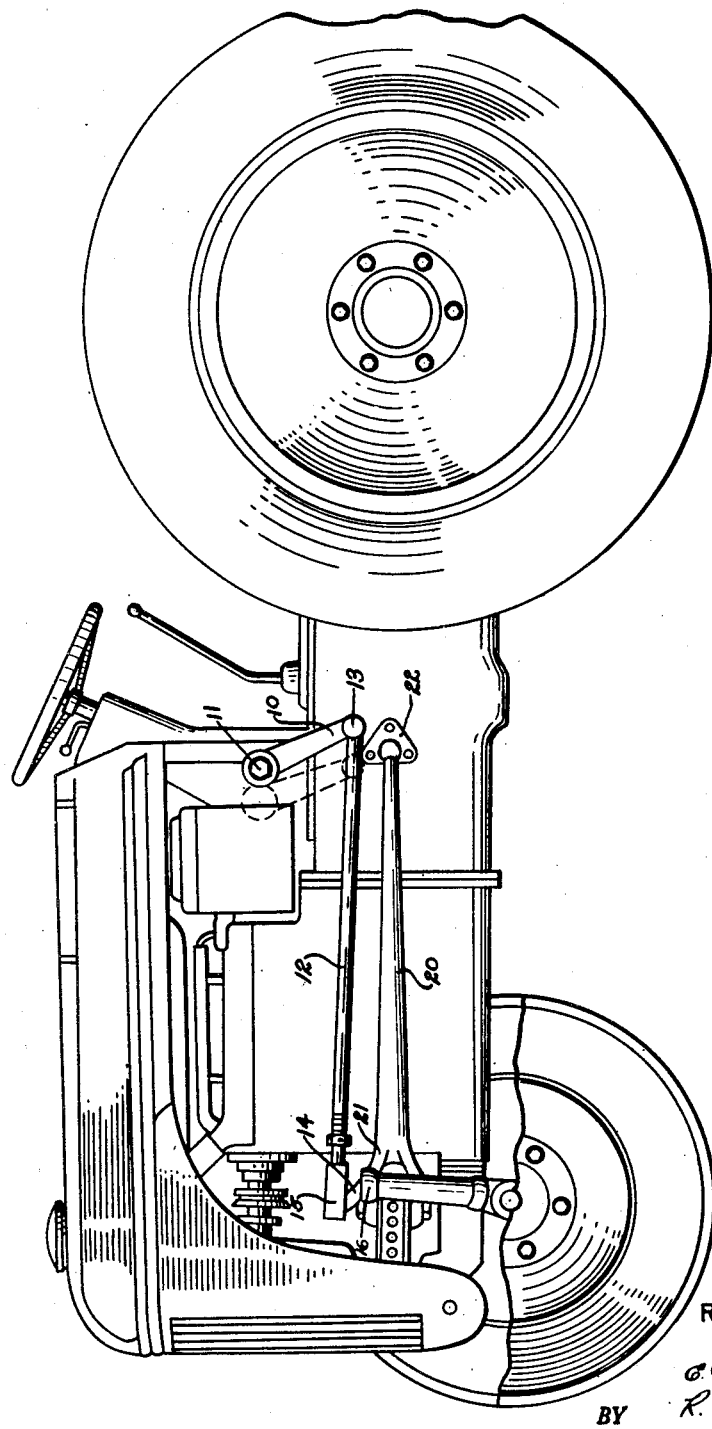
Figure 1 is a side elevation of a tractor showing the general relationship of the various portions thereof.
Figure 2:
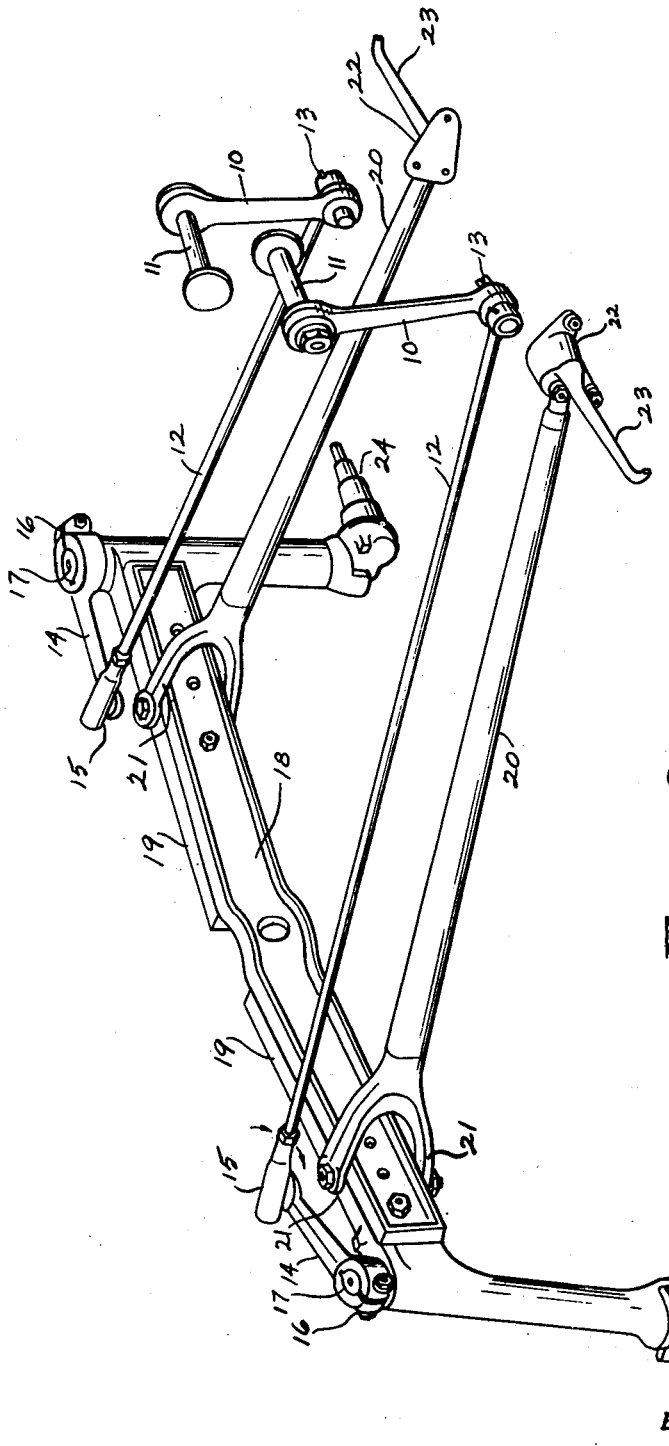
Figure 2 is a perspective of the steering apparatus.

From the side elevation of a tractor shown in Figure 1, a clear idea of the general layout of the steering apparatus can be had. Steering arm 10 is secured at its upper end to offtake shaft 11 of the steering gear box and at its lower end to the rear end of drag link 12 through ball joint 13. The forward end of drag link 12 is secured to the inner end of knuckle link 14 by ball joint 15. The outer end of knuckle link 14 is secured by split fastening 16 to an inclined kingpin 17 (Figure 2). Radius rods 20 are secured at the forward end to the wheel-supporting elements by clevis 21 and are fastened to the frame proper by ball joint 22.

The parts described above in connection with Figure 1 are shown in perspective in Figure 2. This figure shows front axle 18 and supporting elements 19. The wheel-supporting elements 19 are braced near their outer ends by radius rods 20. The actual attachment is made through clevis 21. These wheel-supporting elements are also supported on the outer ends of front axle 18. This support is obtained by tightly bolting together the contiguous faces of front axle 18 and wheel-supporting elements 19. Foot rests 23 are provided at the rear of radius rods 20. Steering effort originating in offtake shafts 11 is transmitted through steering arms 10, drag links 12 and knuckle links 14. Knuckle links 14 revolve inclined kingpins 17 which in turn rotate spindles 24.

Figure 3:
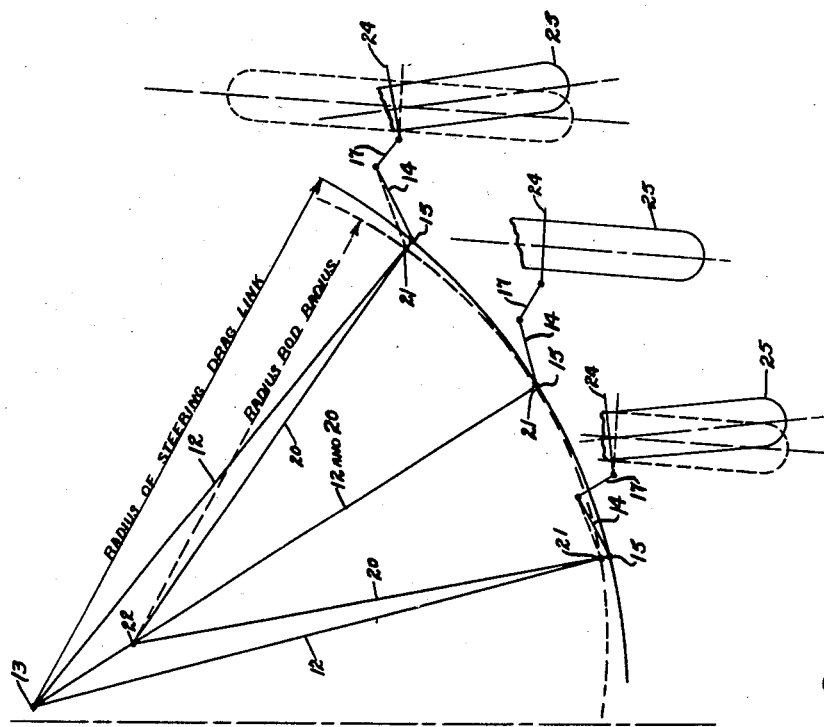
Figure 3 is a schematic showing of the steering mechanism illustrating the positions of the various parts in the innermost position, the middle position and the outermost position.
Figure 3:
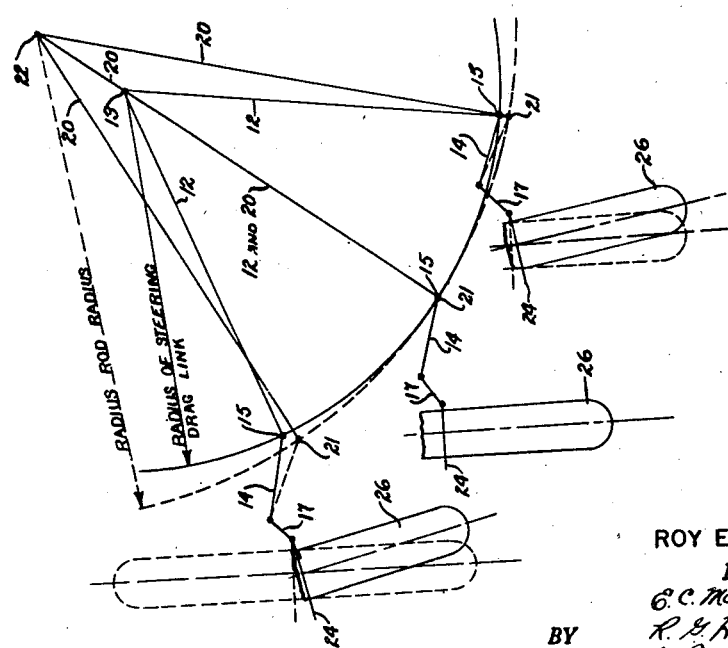

The essence of applicant's invention is best shown in Figure 3 which is a diagrammatic representation of the geometry of the steering system. As in the other figures of drawing, 13 designates the ball joints at the rear end of the drag links 12, 22 designates the ball joint at the rear ends of radius rods 20, 21 depicts the center of the fastenings in the clevis and 15 the ball joints at the forward ends of drag links 12.

This drawing depicts the steering mechanism in three of the seven possible positions obtained by adjustment of wheel-supporting elements 19 along front axle 18. For clarity of illustration, the three positions shown are the innermost, intermediate and outermost adjustments. These correspond to tread of 48, 60 and 72 inches, respectively. However, any other desired adjustments could have been selected and a similar showing made.

Each of these positions corresponds to the identical position of the steering wheel and to the straight forward position of the front wheels in the intermediate tread position. In this drawing, particular attention is invited to the fact that the drag links 12 are directly above the radius rods 20 when the wheels are set in a straight ahead position and at the intermediate tread and that the rear end of the left drag link is rearwardly displaced from a line connecting the rear end of the radius rods a distance equal to the forward displacement of the rear end of the right drag link. This particular construction has been found to give the most satisfactory results. However, the preferred construction will immediately suggest operable variations to one skilled in the art. If otherwise expedient, the longitudinal offsets of the rear ends of the drag links may be somewhat unequal. The drag links and radius rods need not be superimposed upon each other in the position shown but may be so placed at any other convenient position. In Figure 3, the ball joints 13 at the rear ends of drag links 12 are shown displaced horizontally, the left ball joint being far behind the right one. Figure 3 shows left wheel 25 and right wheel 26 in the straight ahead position with the toe-in exaggerated for purposes of illustration. In this drawing the actual positions of knuckle links 14 and spindles 24 are shown in solid lines. For the sake of comparison, the corresponding positions of knuckle links 14 and spindles 24 for the prior art construction in which ball joints 13 and 22 were necessarily directly superimposed have been shown in dotted lines. The arc inscribed by the clevis fastening has been dotted and the arc described by the ball joints 15 at the forward ends of the radius rods have been made solid.

Figure 3 shows the several parts of the steering mechanism adjusted to give the correct toe-in in the intermediate tread width position. In this position all of the dotted lines coincide with solid lines. When the two front wheels are moved to the inner positions shown to give the narrowest tread, ball joints 15 and clevis 21 at the ends respectively of the drag links 12 and radius rods 20 inscribe the arcs and assume the positions shown. In the case of the left wheel, the drag link ball joint 15 is ahead of the clevis 21 and on the right hand the reverse is true. This is a necessary consequence of the fact that the center about which the radius rod swings is behind the center of the drag link on the right side and ahead of it on the left side.

This shift in the relative positions of the clevis and forward ball joint causes both front wheels to turn to the left, albeit the steering gear and steering wheel remain stationary. Since the amount each wheel turns to the left is approximately the same, proper toe-in is maintained. To restore the wheels to the straight ahead position, it is only necessary to rotate the steering wheel slightly to the right. Precisely the same phenomenon occurs when the front wheels are shifted to the outside position. Again correction to the straight ahead position is made by rotating the steering wheel to the right. It is to be noted that in each case in plan view and in the straight ahead intermediate tread width position, the clevis and forward drag link ball joint are directly superimposed and the rear drag link ball joint falls on a line (extended, if necessary) drawn between the clevis and the rear ball joint on the radius rod.

Figure 4:
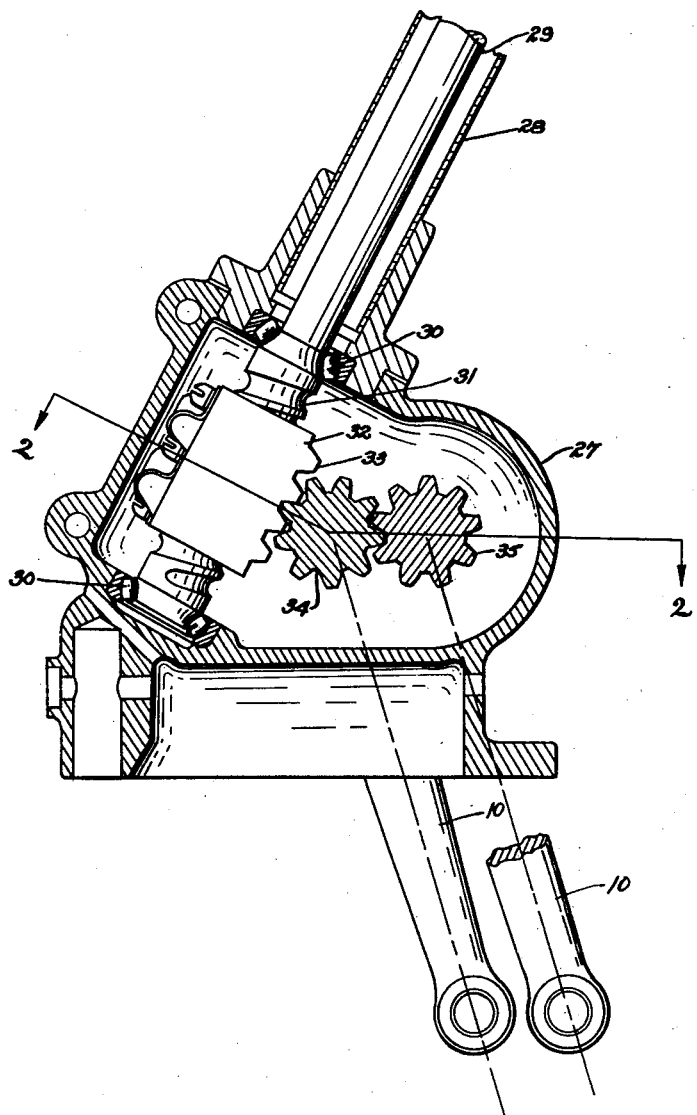
Figure 4 is a section of a steering gear box usable in conjunction with applicant's improved steering mechanism.

While it forms no part of the instant invention, Figure 4 depicts an example of a simplified steering gear box made possible by applicant's invention. Here the steering gear case is generally indicated by 27 and supports steering column 28 which encloses steering shaft 29. This steering shaft 29 rotates in antifriction bearings 30. The lower end of steering shaft 29 is upset to accommodate worm 31. Mounted on worm 31 is ball bearing nut 32. This type of worm and ball bearing nut construction is well-known to those skilled in the art and will not be further described. Rack 33 is cut in one face of ball bearing nut 32. Rotation of steering shaft 29 and worm 30 causes an axial movement of ball bearing nut 32. This produces a rotation of gear 34 in one direction and of gear 35 in the other direction. The output of the steering gear box is taken on two shafts 11 (Figures 1 and 2), one of which is secured to each of gears 34 and 35. The steering arms 10 are secured directly to these shafts 11. This particular steering gear box results in offtake shafts which are horizontally displaced.

However, shafts which are displaced vertically or both horizontally and vertically are contemplated by this invention.

I claim as my invention:

In a vehicle having an adjustable dirigible wheel tread and having a pair of radius rods the rear ends of which are secured to opposite sides of the frame, a steering gear box having an offtake shaft on each side, one of said shafts being displaced ahead of a transverse line connecting the rear attachments of the radius rods an amount approximately equal to the displacement of the other shaft to the rear of said line and separate means operatively connecting each offtake shaft with a dirigible wheel.

ROY E. FARMER.

REFERENCES CITED

The following references are of record in the file of this patent:

UNITED STATES PATENTS

| Number | Name | Date |
|---|---|---|
| 849,145 | Ledwinka | Apr. 2, 1901 |
| 943,227 | Karcher | Dec. 14, 1909 |
| 1,210,056 | Fairman | Dec. 26, 1916 |
| 1,305,297 | Marceau | June 3, 1919 |
| 1,461,027 | Brockson | July 10, 1923 |
| 2,175,965 | Madden | Oct. 10, 1939 |
| 2,220,361 | Westphal | Nov. 5, 1940 |

FOREIGN PATENTS

| Number | Country | Date |
|---|---|---|
| 541,220 | Great Britain | Nov. 18, 1941 |